(12) United States Patent
Bru et al.

(10) Patent No.: US 6,598,146 B1
(45) Date of Patent: Jul. 22, 2003

(54) DATA-PROCESSING ARRANGEMENT COMPRISING A PLURALITY OF PROCESSING AND MEMORY CIRCUITS

(75) Inventors: Bernard Bru, Limeil-Brévannes (FR); Marc Duranton, Boissy St Léger (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 406 days.

(21) Appl. No.: 09/580,169

(22) Filed: May 30, 2000

Related U.S. Application Data

(63) Continuation-in-part of application No. 09/333,633, filed on Jun. 15, 1999, now Pat. No. 6,405,301.

(51) Int. Cl.[7] .............................................. G06F 15/80
(52) U.S. Cl. ......................... 712/17; 345/504; 712/11; 712/15; 712/16
(58) Field of Search ............................... 712/10, 11, 15, 712/16, 17, 24; 345/504

(56) References Cited

U.S. PATENT DOCUMENTS 5,649,135 A * 7/1997 Pechanek et al. ........... 712/200

FOREIGN PATENT DOCUMENTS

| EP | 0780761 A2 | 6/1997 | ............. G06F/9/38 |
|---|---|---|---|
| EP | 0780761 A3 | 6/1997 | ............. G06F/9/38 |
| JP | 7152693 A | 6/1995 | ............ G06F/15/66 |

OTHER PUBLICATIONS

Andre DeHon, "Notes on Coupling Processors with Reconfigurable Logic", Transit Note #118, MIT Artificial Intelligence Laboratory, Mar. 21, 1995.*

* cited by examiner

Primary Examiner—William M. Treat

(57) ABSTRACT

A data-processing arrangement comprises a plurality of elementary circuits such as processing circuits [PRC] and memory circuits [MEM]. The data-processing arrangement further comprises a controller [MCP]. The controller [MCP] is programmed to successively apply, in response to a task-initialization data [TID], control data [CD] to different subsets of elementary circuits. This causes the data-processing arrangement to process a block of data [DB] in accordance with a certain data-processing chain [DPC]. Each subset of elementary circuits implements a different element [E] of the data-processing chain [DPC].

3 Claims, 8 Drawing Sheets

DATA-PROCESSING ARRANGEMENT COMPRISING A PLURALITY OF PROCESSING AND MEMORY CIRCUITS

This is a CIP of Ser. No. 09/333,633, filed Jun. 15, 1999, now U.S. Pat. No. 6,405,301, filed Jun. 15, 1999.

FIELD OF THE INVENTION

The invention relates to a data-processing arrangement comprising a plurality of elementary circuits such as processing and memory circuits. The invention may be applied in, for example, a video-processing arrangement for transforming video data from one to another display format.

BACKGROUND OF THE INVENTION

It is possible to process data in the following manner. A first processing circuit processes a block of data so as to obtain a once processed block of data, which is written into a memory circuit. Subsequently, a second data processor reads the once processed block of data, processes it so as to obtain a twice processed block of data which is written into the same or another memory circuit, and so on. That is, in effect, the data processing circuits form a data processing chain. Each processing circuit carries out a different element of the data-processing chain. The memory circuits provide buffer storage between two successive data processing circuits.

It is possible to provide each processing circuit with a program memory. The program memory will thus contain a set of instructions that cause the processing circuit to carry out the element of the data-processing chain concerned. The European Patent Application published under number 0 373 714 appears to disclose a data processor, which comprises a plurality of processor elements and a program memory for each processor element.

SUMMARY OF THE INVENTION

It is an object of the invention to allow relatively easy programming.

According to the invention, a data-processing arrangement, which comprises a plurality of elementary circuits such as processing and memory circuits, comprises a controller. The controller is programmed to successively apply, in response to a task-initialization data, control data to certain subsets of elementary circuits. This causes the data-processing arrangement to process a block of data in accordance with a certain data-processing chain. Each subset of elementary circuits implements a different element of the data-processing chain.

The invention takes the following aspects into consideration. In prior-art data-processing arrangement, several sets of instructions are required for programming the data-processing arrangement. Each set-is destined for a different processing circuit. Consequently, a software program for the prior-art data-processing arrangement will be relatively voluminous. Furthermore, the respective sets of instructions for the data processing circuits have to match because each element of the data processing chain has to match with its neighboring elements, if any. Consequently, it will be relatively complicated to write a software program for implementing a certain data processing chain. Programming will be even more complicated if the prior-art data-processing arrangement has to implement different data-processing chains because, for example, it has to process different types of data.

According to the invention, a task-initialization data defines a data-processing chain that is composed of several elements in terms of processing operations. The controller programs certain subsets of elementary circuits in response to the task-initialization data so that successively each subset carries out a different element of the data-processing chain. That is, the controller is programmed to appropriately program elementary circuits of the data-processing arrangement in response to a task-initialization data. Consequently, it is sufficient to apply a task-initialization data to the data-processing arrangement so as to cause the data-processing arrangement to process a block of data in a desired fashion. Consequently, the data-processing arrangement can be programmed simply by defining one or more data-processing chains in the form of task-initialization data. Consequently, the invention allows relatively easy programming.

These and other aspects of the invention will be described in greater detail hereinafter with reference to drawings.

EMBODIMENT OF THE INVENTION

The following remarks relate to reference signs. Like entities are designated by like letter references in all Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1:
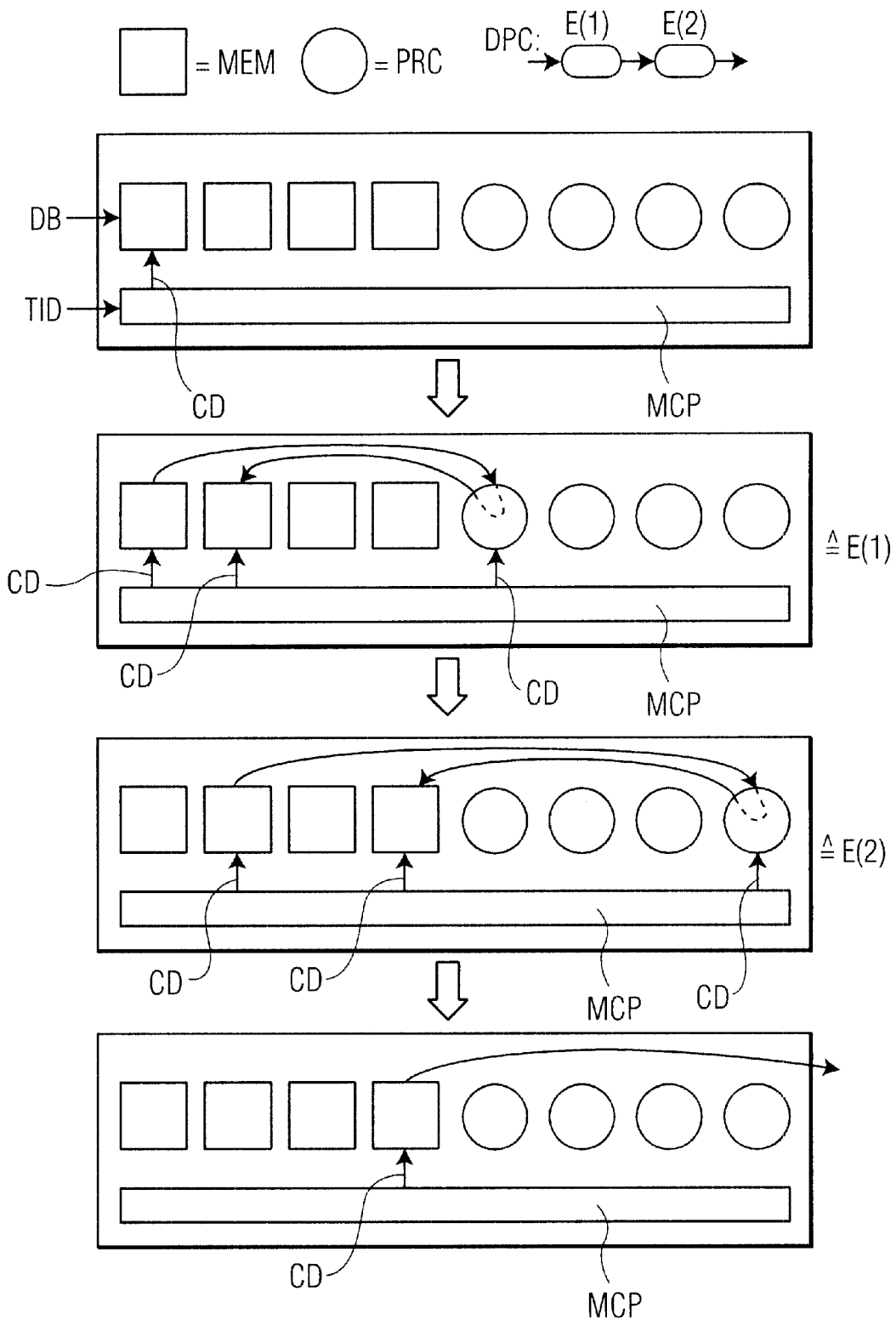
FIG. 1 is a conceptual diagram illustrating basic features of the invention described hereinbefore.

FIG. 1 illustrates basic features of the invention described hereinbefore. A data-processing arrangement comprises a plurality of elementary circuits such as processing circuits [PRC] and memory circuits [MEM]. The data-processing arrangement further comprises a controller [MCP]. The controller [MCP] is programmed to successively apply, in response to a task-initialization data [TID], control data

[CD] to certain subsets of elementary circuits. This causes the data-processing arrangement to process a block of data [DB] in accordance with a certain data-processing chain [DPC]. Each subset of elementary circuits implements a different element [E] of the data-processing chain [DPC].

The following aspects have been taken into consideration with regard to the features illustrated in FIG. 1. In principle, it is possible to wait until a block of data has been completely processed before processing a new block of data. In that case, the data-processing arrangement processes only one block of data at a time. This method has the advantage that the control of the data-processing arrangement will be relatively simple but it has the drawback that relatively few blocks of data can be processed per unit of time. That is, data processing will relatively be slow.

In contrast, the data-processing arrangement can begin to process a new block of data while it is still busy processing one or more other blocks of data. In that case, the data-processing arrangement processes several blocks of data simultaneously. It can do so because, at a given instant, different subsets of elementary circuits can process different blocks of data, respectively. At a given instant, each block of data is processed by a different subset of elementary circuits. This method has the advantage that relatively many blocks of data can be processed per unit of time. That is, data processing will be relatively fast. However, since different subsets of elementary circuits have to be programmed for processing different blocks of data in parallel, the control of the data-processing arrangement may be relatively complicated.

Figure 2:
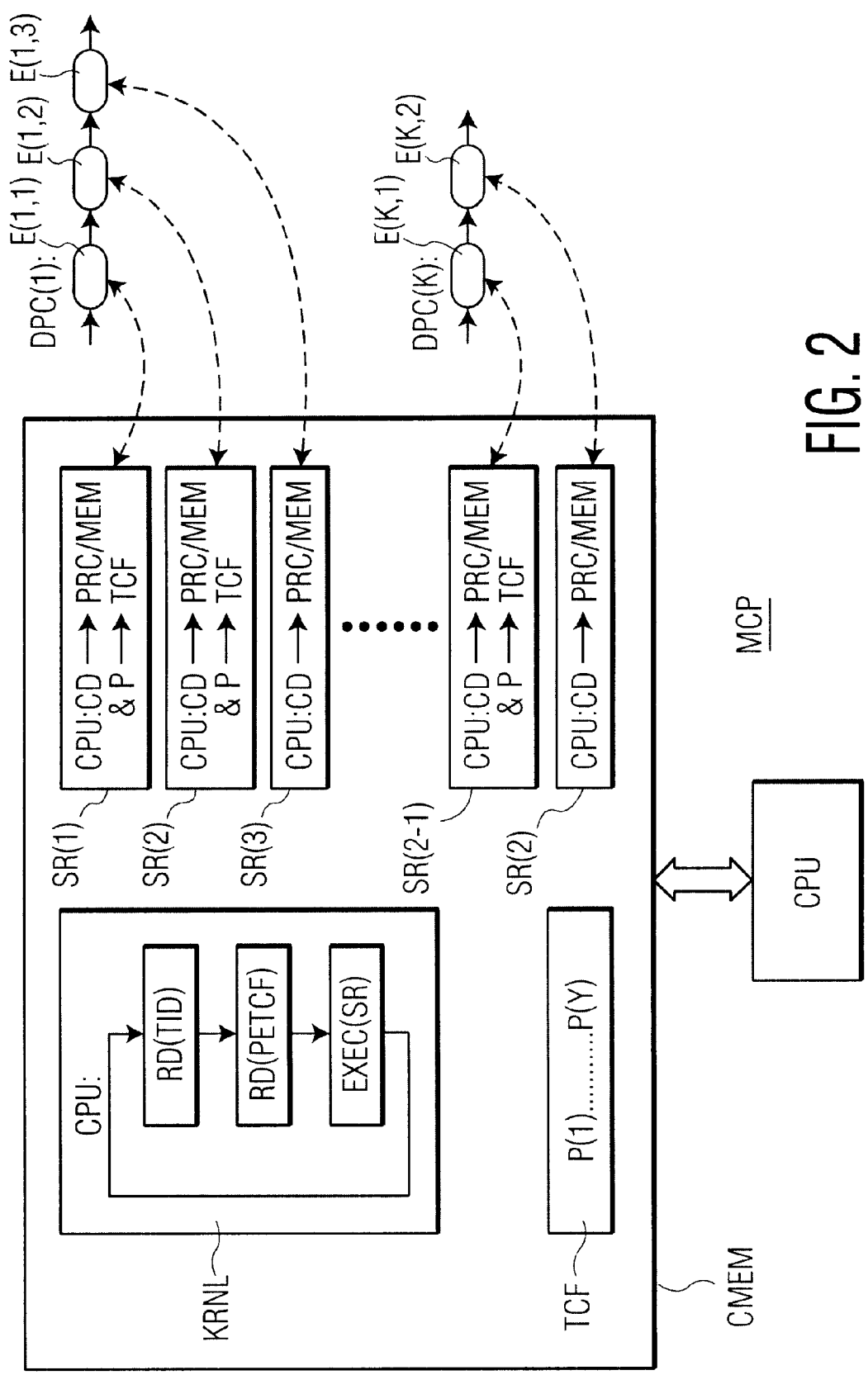
FIG. 2 is a conceptual diagram illustrating additional features.

FIG. 2 illustrates the following additional features. The controller [MCP] comprises a control processor [CPU] and a control memory [CMEM]. The control memory [CMEM] contains a collection of subroutines [SR]. Each subroutine [SR] corresponds to an element [E] of a data-processing chain [DPC]. It causes the control processor [CPU] to apply control data [CD] to a subset of elementary circuits [PRC/MEM] which, in response, will carry out the element [E] of the data-processing chain [DPC] concerned. Each subroutine [SR] that relates to an element [E] of the data-processing chain [DPC] which is succeeded by another element [E] further causes the control processor [CPU] to write a pointer [P] in a task-continuation file [TCF]. The pointer [P] indicates the subroutine [SR] that relates to the subsequent element [E] of the data-processing chain [DPC] concerned The control memory [CMEM] shown in FIG. 2 further contains a basic control program [KRNL]. The basic control program [KRNL] repetitively causes the control processor [CPU] to read a new task-initialization data [RD(TID)], which indicates a subroutine [SR] that relates to a first element of a data-processing chain [DPC]. It further causes the control processor [CPU] to read the pointers that are contained in the task-continuation file [RD(PETCF)]. The basic control program further causes the control processor [CPU] to execute the subroutines indicated by the new task-initialization data and the pointers that have been read [EXEC (SR)].

The items contained in the control memory [CMEM] mentioned hereinbefore repetitively cause the control processor [CPU] to carry out a sequence of control actions. One control action causes the data-processing arrangement to begin processing a new block of data. Other control actions cause the data-processing arrangement to continue processing blocks of data that it has begun to process earlier. More specifically, the items contained in the control memory [CMEM] automatically cause the control processor [CPU] to program different subsets of elementary circuits. Each subset processes a different block of data in parallel with the other subsets. The features illustrated in FIG. 2 thus automatically manage the processing of different blocks of data in parallel. That is, it is sufficient to apply a sequence of task-initialization data to the data-processing arrangement. The controller [MCP] will do the rest. Consequently, the features illustrated in FIG. 2 allow different blocks of data to be processed simultaneously without this requiring complicated software.

The features illustrated in FIG. 1 may be applied in, for example, a video-processing arrangement. Optionally, the features illustrated in FIG. 2 may also be applied. The video-processing arrangement may be used, for example, to modify video data from one to another display format, for example by modifying the number of lines or the number of pixels per line, or both. The video-processing arrangement may also be used, for example, to insert a sub-picture or graphics, or both, into a main picture.

Figure 3:
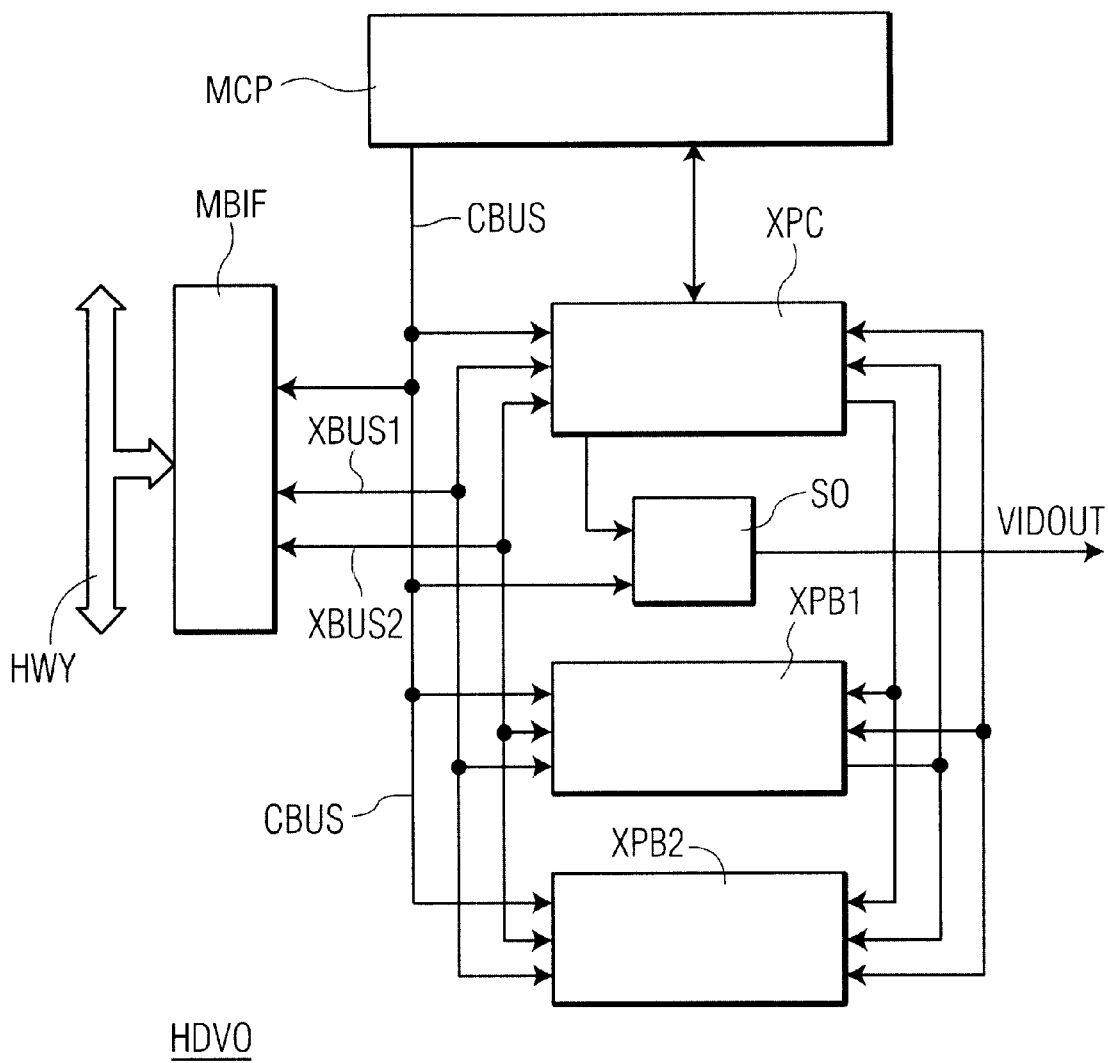
FIG. 3 is a block diagram illustrating a video-processing arrangement in accordance with the invention.

FIG. 3 illustrates a video-processing arrangement in accordance with the invention. The video-processing arrangement receives video data from a main memory, which is not shown, via a main bus [HWY]. In response, it provides a video-output stream [VIDOUT] that may be applied to, for example, a video display device or a video-recording device. The video-processing arrangement comprises a main-bus interface [MBIF], two filter blocks: a first and second filter block [XPB1, XPB2], an output block [XPC], a streaming-out circuit [SO] and a controller [MCP]. The two filter blocks [XPB] and the output block [XPC] are coupled to the main-bus interface [MBIF] via two internal busses: a first and second internal bus [XBUS1, XBUS2]. The controller [MCP] is coupled to the various other blocks shown in FIG. 3 via a control bus [CBUS]. There are data paths that allow data transfers between the two filter blocks [XPB] and the output block [XPC]. These data paths are illustrated in FIG. 3 but not named.

Figure 4:
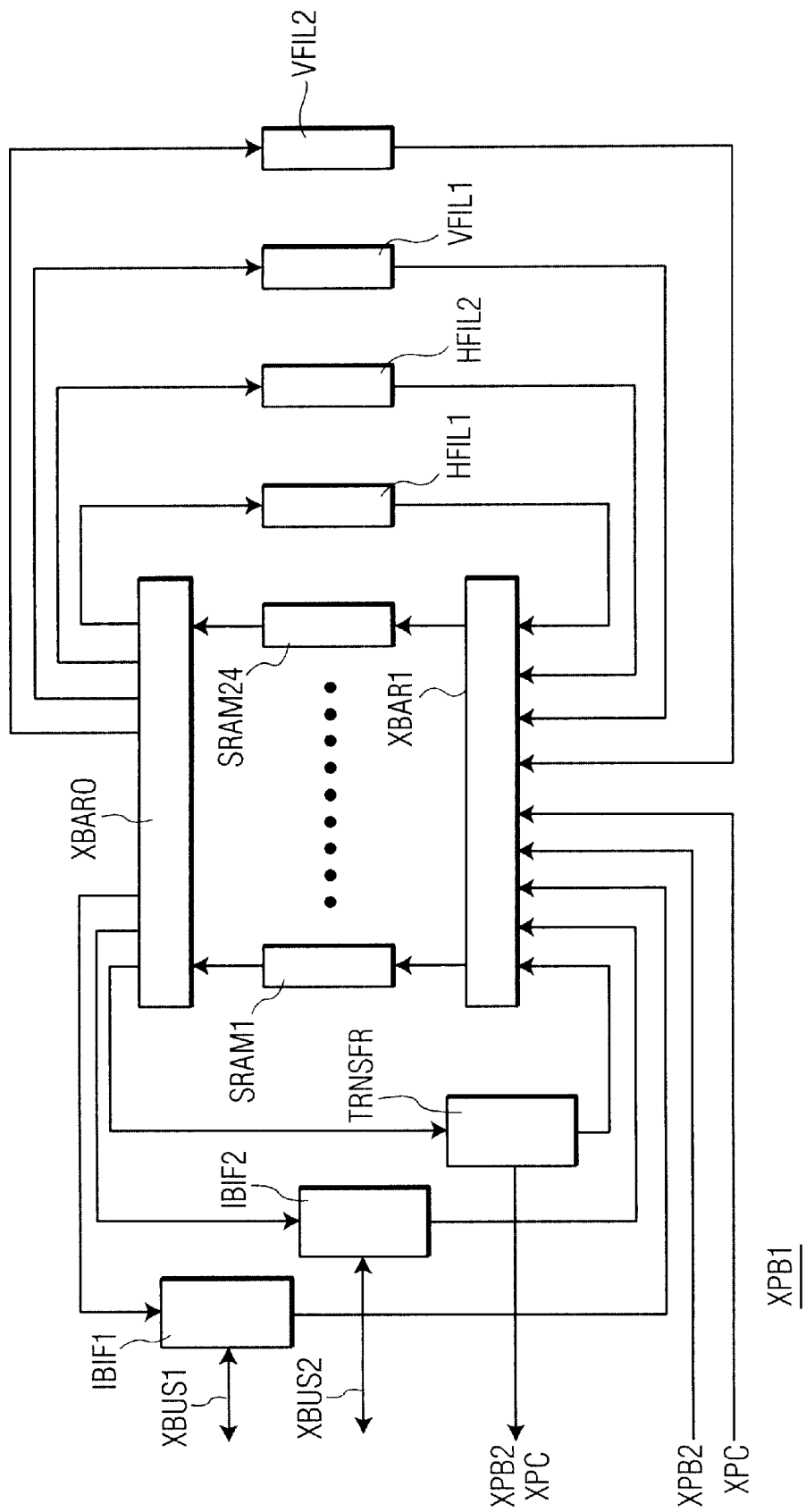
FIG. 4 is a block diagram illustrating a first filter block of the video-processing arrangement.

FIG. 4 illustrates the first filter block [XPB1]. The second filter block [XPB2] is identical. The first filter block [XPB1] comprises two internal-bus interfaces [IBIF], one for each internal bus [XBUS] and a data-transfer circuit [TRNSFR]. The data-transfer circuit [TRNSFR] allows a transfer of data to the other filter block, which is the second filter block [XPB2], and the output block [XPC]. The first filter block [XPB1] further comprises an input cross bar [XBARI], an output cross bar [XBARO], 24 memory circuits in the form of a first to twenty-fourth SRAM [SRAM1–SRAM24], and four processing circuits in the form of a first and second horizontal filter [HFIL1, HFIL2] and a first and second vertical filter [VFIL1, VFIL2]. The input cross bar [XBARI] may receive data from the other filter block, which is the second filter block [XPB2], or from the output block [XPC].

Figure 5:
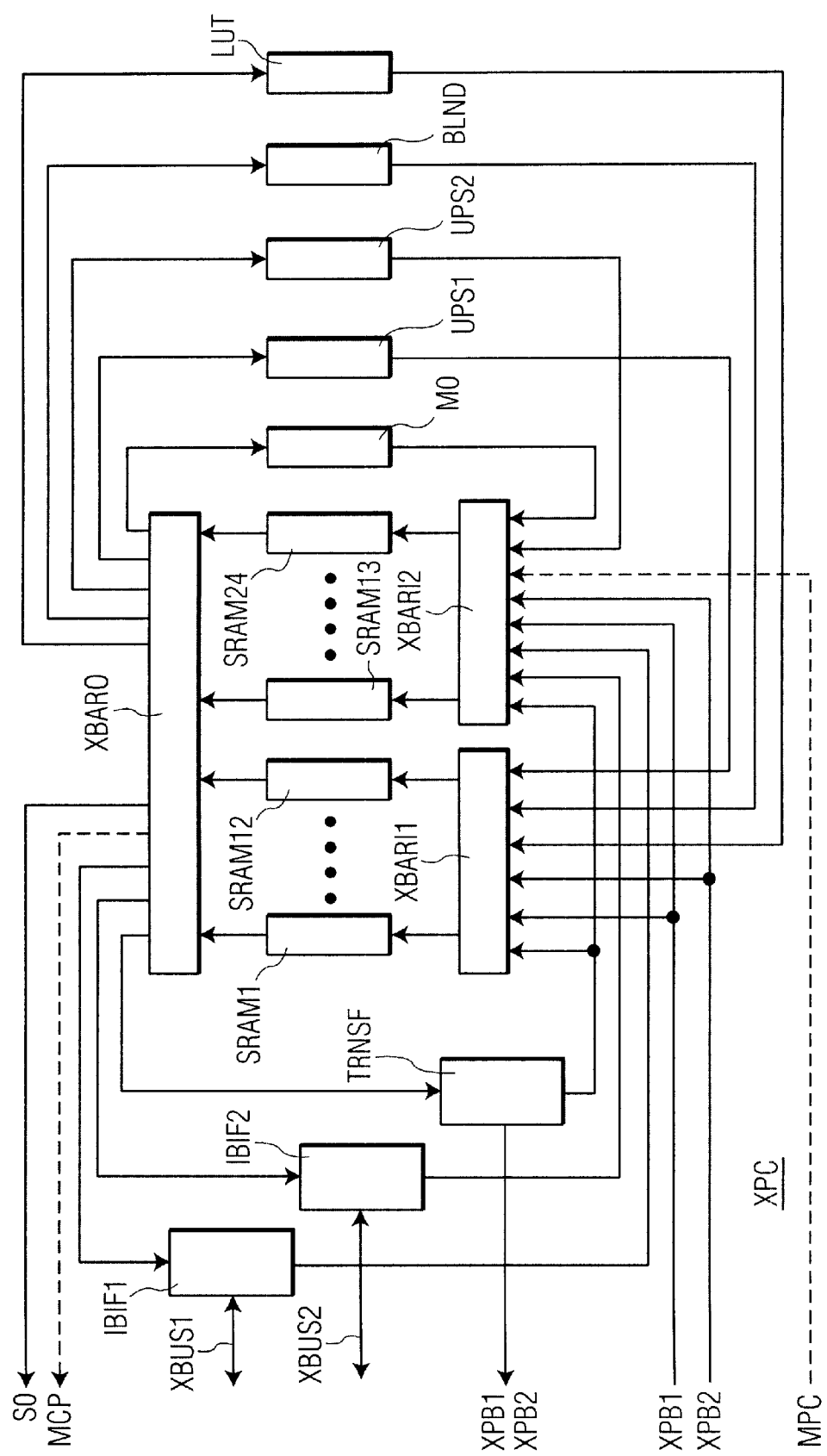
FIG. 5 is a block diagram illustrating an output block of the video-processing arrangement.

FIG. 5 illustrates the output block [XPC]. The output block [XPC] comprises two internal-bus interfaces [IBIF], one for each internal bus [XBUS] and a data-transfer circuit [TRNSFR]. The output block [XPC] further comprises two input cross bars: a first and second input cross bar [XBARI1, XBARI2], an output cross bar [XBARO], 24 memory circuits in the form of a first to twenty-fourth SRAM [SRAM1-SRAM24], and five processing circuits in the form of a matrix/dematrix circuit [MD], two upsamplers [UPS], a blender [BLND] and a look-up table [LUT]. The first and the second input cross bar [XBARI1, XBAR2] may receive data from the two filter blocks [XPB]. The second input cross bar [XBARI2] may also receive data from the controller [MCP]. The output cross bar [XBARO] may apply data to the streaming-out circuit [SO] and the controller [MCP].

The video-processing arrangement illustrated in FIG. 3 basically operates as follows. The main-bus interface [MBIF] fetches a block of pixels from the main memory, which is not shown in FIG. 4, via the main bus [HWY]. Subsequently, the main-bus interface [MBIF] transfers the block of pixels to an SRAM in one of the filter blocks [XPB] or in the output block [XPC] via one of the internal busses [XBUS]. Subsequently, one of the processing circuits in the filter blocks [XPB], or the output block [XPC], processes the block of pixels. Accordingly, a once-processed block is obtained. It is stored in another SRAM. Subsequently the same or another processing circuit may process the once-processed block of pixels. This step-by-step processing continues until a completely processed block of pixels is obtained that is stored in an SRAM in the output block [XPC]. Subsequently, the output block [XPC] transfers the completely processed block of pixels to the streaming-out circuit [SO].

The video-processing arrangement carries out the processing described hereinbefore successively for different blocks of pixels. Consequently, the streaming-out circuit [SO] receives successive completely processed blocks of pixels. It casts the pixels it receives in an appropriate format and adds some synchronization signals. Accordingly, the video-output stream [VIDOUT] is obtained.

Figure 6:
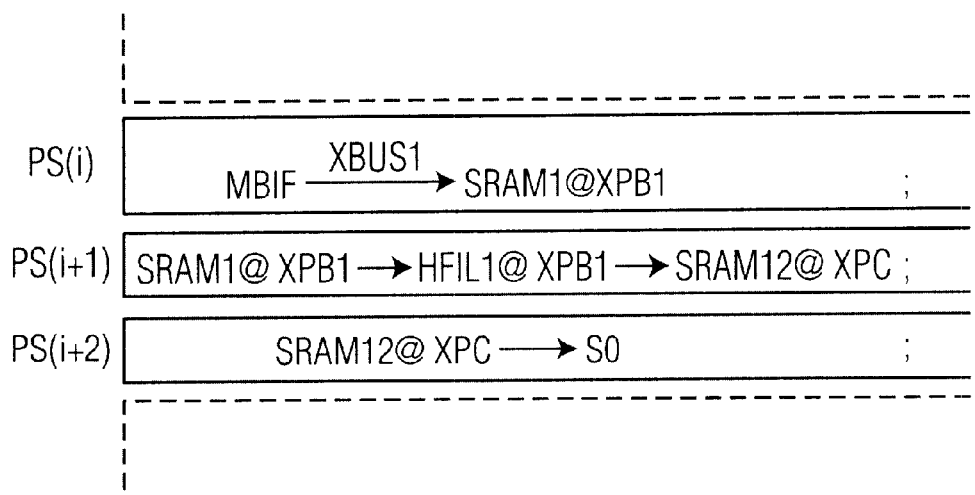
FIG. 6 is a diagram illustrating an example of how the video-processing arrangement processes a block of pixels.

FIG. 6 illustrates an example of the processing of a block of pixels. It comprises three processing steps: an (i)-th, (i+1)-th and (i+2)-th processing step [PS(i), PS(i+1), PS(i+2)]. It assumed that the main-bus interface [MBIF] shown in FIG. 3 has already fetched the block of pixels from the main memory. The block of pixels is therefore present in the main-bus interface [MBIF].

In the (i)-th processing step [PS(i)], the main-bus interface [MBIF] transfers the block of pixels to the first SRAM [SRAM1] in the first filter block [XPB1] via the first internal bus [XBUS1]. In the (i+1)-th processing step [PS(i+1)], the first filter block [XPB1] processes the block of pixels. More specifically, the first horizontal filter [HFIL1] reads the block of pixels from the first SRAM [SRAM1] pixel-by-pixel, it processes the pixels that it reads and it writes processed pixels in the twelfth SRAM [SRAM12] of the output block [XPC]. This transfer goes via the output crossbar [XBARO] and the data-transfer circuit [TRNSFR] of the first filter block [XPB1] illustrated in FIG. 4, and via the first input crossbar [XBARI1] of the output block [XPC] illustrated in FIG. 5. Accordingly, the twelfth SRAM [SRAM12] of the output block [XPC] will contain a processed block of pixels at the end of the (i+1)-th processing step [PS(i+1)]. In the (i+2)-th processing step [PS(i+2)], the output block [XPC] transfers the processed block of pixels to the streaming-out circuit [SO].

The processing illustrated in FIG. 6 corresponds to a video-processing chain that is composed of a single horizontal filter. The video-processing arrangement illustrated in FIG. 3 allows many different video-processing chains. For example, it allows a video-processing chain that comprises a sequence of filters, some of which may be in parallel, and other types of processing such as, for example, blending, up- or down sampling. The SRAMs, which are comprised in the two filter blocks [XPB] and the output block [XPC], serve as FIFO memories between two successive elements in a video-processing chain, an element being a certain processing operation.

In principle, the video-processing arrangement illustrated in FIG. 3 can begin to process a new block of pixels each processing step. Thus, the video-processing arrangement can process different blocks of data simultaneously during a certain processing step. For example, referring to FIG. 6, in the (i+1)-th processing step [PS(i+1)], the main-bus interface [MBIF] may transfer a new block of pixels to an SRAM of the first or second filter block [XPB1, XPB2] or the output block [XPC]. The new block of pixels may undergo, for example, the video-processing chain illustrated in FIG. 6. In that case, the operations illustrated in FIG. 6 shift by one processing step for the new block of pixels.

Moreover, the video-processing arrangement illustrated in FIG. 3 can begin to process two new blocks of pixels each processing step. This is related to the presence of the two internal busses [XBUS]. Each internal bus [XBUS] allows a transfer of a block of pixels from the main-bus interface [MBIF] to the first or second filter block [XPB1, XPB2] or the output block [XPC] within a single processing step. For example, referring to FIG. 6 and the (i)-th processing step [PS(i)] illustrated therein, while the main-bus interface [MBIF] transfers the block of pixels concerned to the first SRAM [SRAM1] of the first filter block [XPB1] via the first internal bus [XBUS1], it may transfer another block of pixels to another SRAM in the first filter block [XPB1] or an SRAM in the second filter block [XPB2] or the output block [XPC] via the second internal bus [XBUS2].

The controller [MCP] shown in FIG. 3 causes the video-processing arrangement to process a block of pixels in accordance with a certain video-processing chain. This processing involves a series of processing steps [PS] as described hereinbefore with reference to FIG. 6. Furthermore, the processing in a certain processing step [PS] involves only a certain subset of circuits present in the video-processing arrangement. For each processing step, the controller [MCP] suitably programs the subset of circuits that is involved in that processing step.

For example, let us consider the processing illustrated in FIG. 6 and, more specifically, the processing in the (i+1-th processing step [PS(i+1)]. It involves the following circuits of the first filter block [XPB1] illustrated in FIG. 4: the first SRAM [SRAM1], the input cross bar [XBARI], the first horizontal filter [HFIL1], the output cross bar [XBARO] and the transfer block [TRNSFR]. The processing also involves the following circuits of output block [XPC] illustrated in FIG. 5:the first input cross bar [XBARI1] and the twelfth SRAM [SRAM12].

The controller [MCP] shown in FIG. 3 programs the aforementioned circuits so that, in combination, they carry out the processing illustrated in the (i+1)-th processing step [PS(i+1)] shown in FIG. 6 and described hereinbefore. The controller [MCP] programs the first SRAM [SRAM1] of the first filter block [XPB1] so that it provides the block of pixels that need to be filtered. It may do so, for example, by defining an appropriate read start-address. The controller programs the input cross bar [XBARI] of the first filter block [XPB1] so that it couples the first [SRAM1] with the first horizontal filter [HFIL1]. The controller programs the first horizontal filter [HFIL1] so that it carries out the desired type of filtering. The controller [MCP] programs the output cross bar [XBARO] and the data-transfer circuit [TRNSFR] of the first filter block [XPB1] and the first input cross bar [XBARI1] of the output block [XPC] so that these circuits couple the first horizontal filter [HFIL1] of the first filter block [XPB1] with the twelfth SRAM [SRAM12] of the output block [XPC]. Finally, the controller [MCP] programs the twelfth SRAM [SRAM12] in output block [XPC] so that the filtered pixels are appropriately stored. It may do so, for example, by defining an appropriate write start-address.

The circuits of the two filter blocks [XPB] illustrated in FIG. 4 and the output block [XPC] illustrated in FIG. 5 have control registers. The content of a control register defines the functional behavior of the circuit to which the control register belongs. Consequently, the controller [MCP] shown in FIG. 3 programs the circuits in the filter blocks [XPB] and the output block [XPC] by writing control data into the respective control registers. The controller [MCP] can also program a circuit by managing the control data that are already contained in the control register of that circuit.

Figure 7:
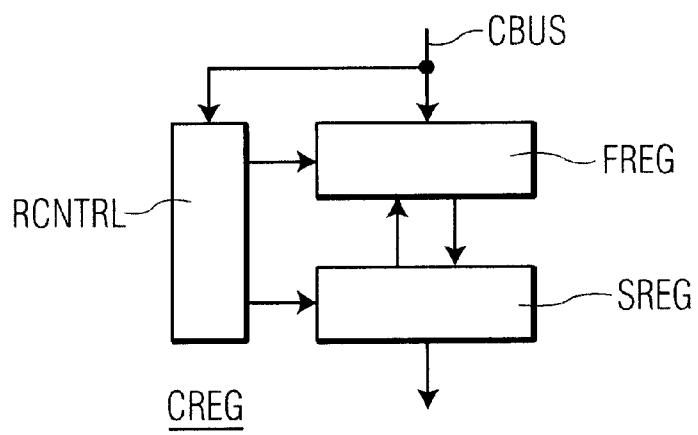
FIG. 7 is a block diagram illustrating a control register of the video-processing arrangement.

FIG. 7 illustrates a control register [CREG]. The control register [CREG] comprises a front register [FREG], a shadow register [SREG] and a register controller [RCNTRL]. It basically operates as follows. The control register [CREG] receives control data from the controller [MCP] shown in FIG. 3 via the control bus [CBUS] also shown in FIG. 3. This control data is first written into the front register [FREG]. In response to a control command from the controller [MCP], the register controller [RCNRTL] may cause the control data to be transferred to the shadow register [SREG]. The control data that is contained in the shadow register [SREG] defines the functional behavior of the circuit to which the control register belongs. The control data that is contained in the shadow register [SREG] may be transferred back to the front register [FREG] when the control data that is contained in the front register [FREG] is transferred to the shadow register [SREG]. The register controller [RCNTRL] causes this swap operation to be carried out in response to a control command from the controller [MCP].

Figure 8:
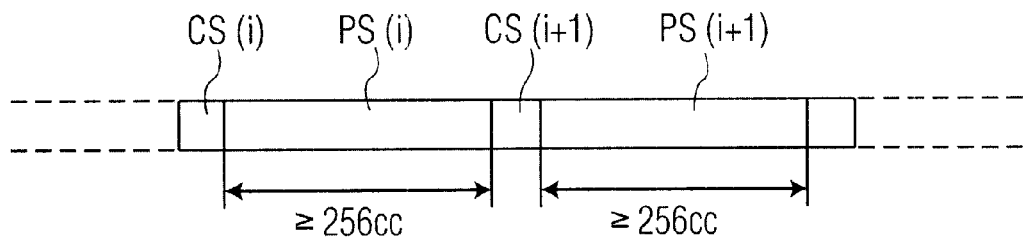
FIG. 8 is a diagram illustrating the basic operational scheme of the video-processing arrangement.

FIG. 8 illustrates the basic operational scheme of the video-processing arrangement illustrated in FIG. 3. The horizontal dimension represents time in clock cycle units. The video-processing arrangement alternately carries out processing steps [PS] and configuration steps [CS].

In a processing step [PS], the video-processing arrangement manipulates one or more blocks of pixels. For example, a block of pixels may be passed through a processing circuit or simply transferred from one memory circuit to another memory circuit. In parallel, another block of pixels may be passed through another processing circuit or transferred to yet another memory circuit. These manipulations of blocks of pixels are defined by the control data that are contained in the shadow registers of the respective circuits in the video-processing arrangement.

In a processing step [PS], the controller [MCP] shown in FIG. 3 may write control data into various control registers while data is being processed. It further instructs the respective register controllers what action they should carry out in the configuration step [CS] that will follow. The respective control data in the shadow registers is not modified because these control data define the data manipulations that are being carried out. The writing of control data into the front registers during a processing step can be seen as a preparation for the subsequent processing step. That is, while data is being manipulated during an (n)-th processing step [PS(n)], the data manipulations to be carried in the subsequent (n+1)-th processing step [PS(n+1)] are defined.

In a configuration step [CS], the content of the respective shadow registers can be modified. For example, referring to the control register [CREG] illustrated in FIG. 8, the register controller [RCNTRL] can cause the shadow register [SREG] to take over the control data that is contained in the front register [FREG]. The register controller [RCNTRL] may also leave the control data in the shadow register [SREG] unaltered. Thus, a configuration step [CS] merely involves a transfer of control data within the respective control registers, if there is any such transfer. Moreover, control data can be transferred simultaneously in the respective control registers. Consequently, a configuration step will require a few clock cycles only.

The processing steps [PS] and the configuration steps [CS] alternately succeed one another in the following manner. Let it be assumed that the video-processing circuit illustrated in FIG. 3 carries out a processing step. This generally implies that various processing circuits process blocks of pixels. A processing circuit that has processed its block of pixels signals the controller [MCP] shown in FIG. 3 that it has completed its job. The controller [MCP] initiates a configuration step when it has received such a ready signal from each processing circuit that was active. Likewise, a control register that has transferred control data as instructed signals to the controller [MCP] that it has completed its job. This implies that the appropriate control data has been placed in the shadow register. The controller [MCP] initiates a processing step [PS] when it has received such a configuration-ready signal from each control register in which a control-data transfer took place.

Figure 9:
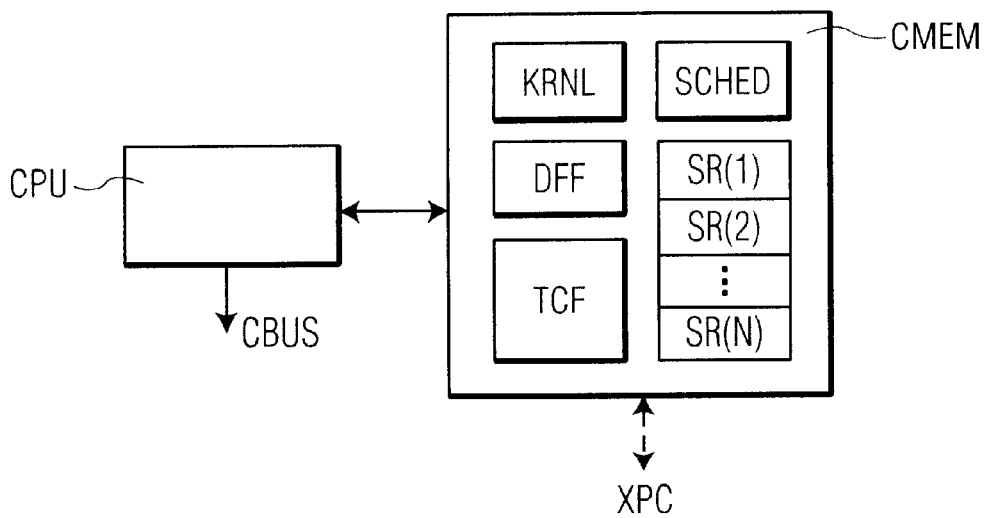
FIG. 9 is a block diagram illustrating a controller of the video-processing arrangement.

FIG. 9 illustrates the controller [MCP] of the video-processing arrangement. The controller [MCP] comprises a control processor [CPU] and a control memory [CMEM]. The control memory [CMEM] contains the following items: a kernel [KRNL], a library of subroutines [SR], a scheduler [SCHED], a data-fetch file [DFF] and a task-continuation file [TCF]. The control memory [CMEM] may also contain further items of data such as, for example, variables. The kernel [KRNL] and the subroutines [SR] comprise instructions for the control processor [CPU]. The scheduler [SCHED], the data-fetch file [DFF] and the task-continuation file [TCF] comprise addresses of subroutines.

A sub-routine [SR] defines a certain manipulation of a block of data during a processing step [PS]. For example, FIG. 6 illustrates that in the (i+1)-th processing step [PS(i+1)] a block of pixels is read from the first SRAM [SRAM1] in the first filter block [XPB1] so as to be processed by the first horizontal filter [HFIL1] in the first filter block [XPB1], the processed block of pixels being written into the twelfth SRAM [SRAM12] in the output block [XPC]. This manipulation can thus be defined by a means of a sub-routine [SR]. In terms of video signal processing, a subroutine [SR] relates to a certain element of a video-signal processing chain.

More specifically, a sub-routine [SR] causes the control processor [CPU] to program the video-processing arrangement such that the requested manipulation will be carried out. That is, a sub-routine [SR] causes the control processor [CPU] to write control data into the control register [CREG] of the circuits that are involved in the manipulation, or to move control words already contained in these control register [CREG], or both, so that the shadow registers [SREG] of these circuits contain appropriate control data.

Figure 10:
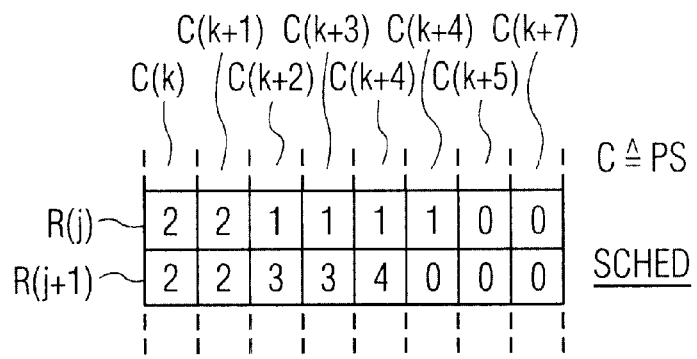
FIG. 10 is a diagram illustrating a portion of a scheduler for the controller.

FIG. 10 illustrates a portion of the scheduler [SCHED]. The scheduler [SCHED] is shown as matrix having rows and columns. FIG. 10 shows a part of the scheduler [SCHED] only: a (j)-th and (j+1)-th row [R(j), R(j+1)] and a (k)-th to (k+7)-th column [C(k), . . . C(k+7)]. The part of the scheduler [SCHED] that is shown concerns one line period of a picture. Each cell defines a certain task for the video-processing arrangement. A task concerns a block of data that is contained in the main memory. The number of the task, 0, 1, 2, 3 or 4, defines what type of data is concerned and what the video-processing arrangement should do with this data in terms of data processing and transfers.

For example, task number 1 may concern a block of luminance pixels for a high-definition picture. Task number 2 may concern a block of chrominance pixels for the same high-definition picture. Task number 3 may concern a block of luminance pixels for a standard-definition picture. Each different block of pixels should be processed in accordance with a different video signal-processing chain. The task number 4 may concern new data for the scheduler [SCHED]. It consists of updating the scheduler [SCHED] with this new data. Task number 0 (zero) is a so-called empty task. An empty task does not relate to a block of data and, consequently, it does not cause the video-processing arrangement to transfer or process any data.

More specifically, a cell that defines a non-empty task (1,2,3,4) contains a start address of a sub-routine. This sub-routine is the first of a chain sub-routines that causes the video-processing arrangement to carry out the required task. A sub-routine whose start address is contained in the scheduler [SCHED] will therefore be called first sub-routine hereinafter. Each sub-routine of a chain is carried out in a different processing step.

The chains of subroutines are formed and managed by means of the following items contained in the control memory [CMEM] shown in FIG. 9: the kernel [KRNL], the data-fetch file [DFF] and the task-continuation file [TCF]. That is, these items cause the control processor [CPU] to control the video-processing arrangement so that it properly carries out the various tasks defined in the scheduler [SCHED]. This will now be explained in greater detail.

Referring to FIG. 3, a first sub-routine instructs the main-bus interface [MBIF] to fetch the block of data concerned from the main memory. In addition, the first sub-routine will write a start address of a second sub-routine into the data-fetch file [DFF] shown in FIG. 9. The second sub-routine will cause the main-bus interface [MBIF] to transfer the block of data to a memory circuit in the first or second filter block [XPB1, XPB2] or the output block [XPC]. This transfer will take place via the first or second internal bus [XBUS1, XBUS2] depending on whether the start-address of the first sub-routine was in the (j)-th or (j+1)-th row [R(j), R(j+1)], respectively, of the scheduler [SCHED] illustrated in FIG. 10. The second sub-routine should be executed only when it is certain that the block of data concerned is present in the main-bus interface [MBIF]. To that end, the second sub-routine is executed after a certain delay. This delay is implemented by means of the data-fetch file [DFF] in the control memory [CMEM] shown in FIG. 9.

Figure 11:
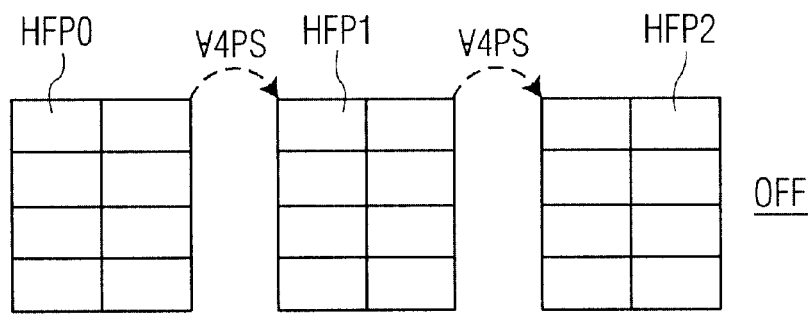
FIG. 11 is a diagram illustrating a data-fetch file for the controller.

FIG. 11 illustrates the data-fetch file [DFF]. The data-fetch file [DFF] can functionally be regarded as a collection of three registers in the form of tables: an initial, intermediate and final highway-fetch register [HFP0, HFP1, and HFP2]. Each highway-fetch register [HFP] corresponds to 4 consecutive processing steps. More specifically, each row of a highway-fetch register [HFP] corresponds to a processing step.

The data-fetch file [DFF] functionally behaves as follows. In an (n)-th processing step, the control processor [CPU] shown in FIG. 9 executes the first subroutines that are defined in the cells on the (j)-th and (j+1)-th row [R(j), R(j+1)] and in the (k)-th column [C(k)] of the scheduler [SCHED] illustrated in FIG. 10. These first subroutines will cause the control processor [CPU] to write the start addresses of the respective second subroutines in the first row of the initial highway-fetch register [HFP0]. In a subsequent (n+1)-th processing step, the control processor [CPU] executes the first subroutines that are defined in the cells on the (j)-th and (j+1)-th row [R(j), R(j+1)] and in the (k+1)-th column [C(k+1)] of the scheduler [SCHED] illustrated in FIG. 10. These first subroutines will cause the control processor [CPU] to write start addresses of the respective second subroutines in the second row of the initial highway-fetch register [HFP0].

The procedure described in the preceding paragraph continues processing step by processing step. Consequently, the initial highway-fetch register [HFP0] will be completely filled in an (n+4)-th processing step. Its content is then copied to the intermediate highway-fetch register [HFP1] after the content of the intermediate highway-fetch register [HFP1] has been copied to the final highway-fetch register [HFP2]. In effect, the highway-fetch registers [HFP] are shifted one position to the left each cycles of 4 processing steps. In an (i+5)-th processing step, the control processor [CPU] shown in FIG. 9 executes the first subroutines that are defined in the cells on the (j)-th and (j+1)-th row [R(j), R(j+1)] and in the (k+5)-th column [C(k+5)] of the scheduler [SCHED] illustrated in FIG. 10. Since the initial highway-fetch register [HFP0] has been emptied, these first subroutines will cause the control processor [CPU] to write the start addresses of the respective second subroutines in the first row of the initial highway-fetch register [HFP0].

The control processor [CPU] shown in FIG. 9 reads start addresses of respective second subroutines from the final highway-fetch register [HFP2] so as to execute these subroutines. More specifically, when the control processor [CPU] has written a start address of a second sub-routine in a cell of the initial highway-fetch register [HFP0], it subsequently reads a start address of a second sub-routine from the cell in the final highway-fetch register [HFP2] that has the same position. The control processor [CPU] will then execute the latter second sub-routine whose start address it has read from the final highway-fetch register [HFP2]. It has already been explained the highway-fetch registers [HFP] are shifted one position to the left each cycle of 4 processing steps.

Consequently, the data-fetch file [DFF] illustrated in FIG. 11 causes a delay of 8 processing steps between the first sub-routine of a task, which is a request for data from the main memory, and the second sub-routine of the task, which is the transfer of this data from the main-bus interface [MBIF] shown in FIG. 3 to the first or second filter block [XPB1, XPB2] or the output block [XPC] also shown in FIG. 3. This delay accounts for a latency, which accompanies data fetches via the main bus [HWY] and the main-bus interface [MBIF]. This latency, as well as the main-bus interface [MBIF], will be described in greater detail hereinafter.

When the control processor [CPU] shown in FIG. 9 has carried out the first and second sub-routine of a task, the block of data which is the subject of that task will be present in a memory circuit of the first or second filter block or the output block. The video-processing arrangement is then ready to process the block of data, or just transfers it, by means of a third and further subroutines. These subroutines are executed as follows.

The second sub-routine causes the control processor [CPU] shown in FIG. 9 to write the start address of the third sub-routine in the task-continuation file [TCF] also shown in FIG. 9. This writing is done within the processing step wherein the second sub-routine is executed. In the subsequent processing step, the control processor [CPU] reads the start address of the third sub-routine and carries out this sub-routine. This causes the control-processor [CPU] to write the start address of a fourth sub-routine, if any, in the task-continuation file [TCF]. In the then subsequent processing step, the control processor [CPU] reads the start address of the fourth sub-routine and carries out this sub-routine. This causes the control processor [CPU] to write the start address of a fifth sub-routine, if any, in the task-continuation file [TCF]. This procedure continues until the last sub-routine of the task has been carried out. The task has then been completed.

Referring to FIG. 9, the kernel [KRNL] is the program that causes the control processor [CPU] to read start addresses of subroutines in the scheduler [SCHED], the data-fetch file [DFF] and the task-continuation file [TCF] and to carry out these subroutines as described hereinbefore. The kernel [KRNL] can be activated by means of an interrupt that is generated in the streaming-out circuit [SO] shown in FIG. 3. This interrupt indicates that the video-output stream [VIDOUT] has reached a certain point in a current frame. A frame typically comprises some blanking lines before the lines to be displayed. The streaming-out circuit [SO] may apply an interrupt to the control processor [CPU] so as to activate the kernel [KRNL] when, for example, the video-output stream [VIDOUT] has reached the last-but-one blanking line. The kernel [KRNL] may be stopped after the task that concerns the last block of pixels of a frame. The scheduler [SCHED] illustrated in FIG. 10 preferably comprises a special task which appropriately stops all processing and resets the circuits in the video-processing arrangement.

Figure 12:
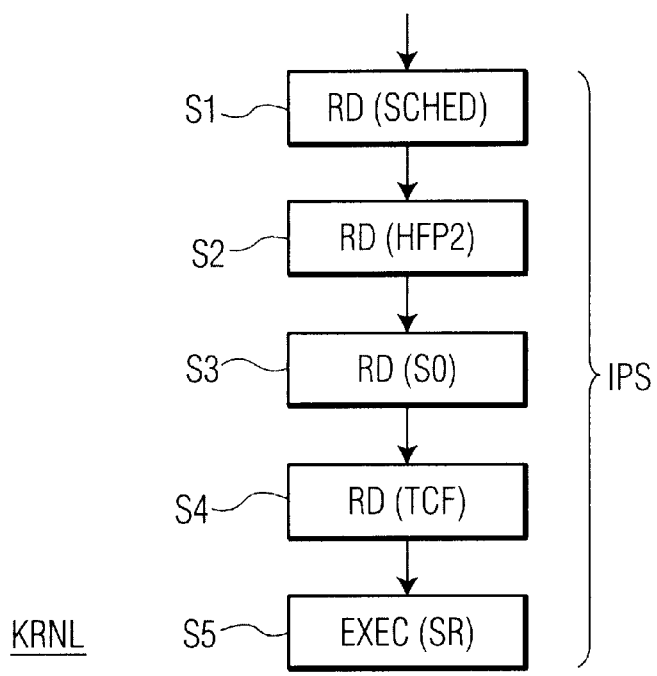
FIG. 12 is a diagram illustrating a series of steps that controller carries out.

FIG. 12 illustrates a series of steps that the kernel [KRNL] causes the control processor to carry out each processing step. It is assumed, of course, that the kernel [KRNL] is active. The series of steps comprise a first to fifth step [S1–S5].

In the first step [S1], the control processor reads two cells in the scheduler [SCHED] illustrated in FIG. 10 [RD (SCHED)]. The two cells that are read depend on the current processing step and the current line. Referring to FIG. 10, the control processor moves one column to the right every processing step that belongs to a certain line. The control processor moves two rows downwards every new line. A line can be defined in terms of a certain number of processing steps. For example, in FIG. 10, a line comprises 8 processing steps. It has already been explained that a cell of the scheduler [SCHED] defines a tasks in the form of a start addresses of a first sub-routine of a chain of subroutines. Thus, in the first step [S1], the control processor reads two first-subroutine start addresses and writes these start addresses into a subroutine-execution file. This file may be, for example, in the form of an assembly of registers.

In the second step [S2], the control processor reads two cells on a row in the final highway-fetch register [RD (HFP2)]. The two cells that are read depend on the current processing step. Referring to FIG. 11, the control processor moves one row downwards every processing step until the last row has been reached. The next row will then be the top row of the final highway-fetch register [HFP2]. It has already been explained that the cells of the final highway-fetch register [HPF2] contain start addresses of second subroutines in a task. Thus, in the second step [S2], the control processor reads two second-subroutine start addresses and writes these start-addresses into the subroutine-execution file.

In the third step [S3], the control processor reads a pointer in the streaming-out circuit [SO] shown in FIG. 3 [RD(SO)]. This pointer indicates the fullness of a buffer in which processed pixels are temporarily stored before the are outputted in the form of video-output stream [VIDOUT]. The pointer tells the control processor [CPU], as it were, whether the streaming-out circuit [SO] needs further processed pixels or not.

In the fourth step [S4], the control processor reads the start addresses that are contained in the task-continuation file [TCF] shown in FIG. 9. These start addresses concern third and further subroutines in a task. That is, the task-continuation file [TCF] contains the start addresses of the subroutines other than the first and second sub-routine of a task. The control processor writes the start addresses that it reads from the task-continuation file [TCF] into the addresses into the subroutine-execution file.

In the fifth step [S5], the control processor reads the start addresses that are contained in the subroutine-execution file one after the other. In response, the control processor executes the subroutines that go with these start addresses one after the other. Thus, it can be said that, for each processing step, the control processor makes a list of subroutines to be executed in the first to fourth step [S1–S4] and that it actually executes the subroutines which are in this list in fifth step [S5].

The following aspect of the kernel [KRNL] is not shown in FIG. 11. In principle, the video-processing arrangement illustrated in FIG. 3 processes successive blocks of pixels faster than the streaming-out circuit [SO] outputs pixels in the form of the video-output stream [VIDOUT]. Thus, the video-processing arrangement should interrupt its processing from time to time so as to prevent an overflow in the streaming-out circuit [SO]. The video-processing arrangement can be made to interrupt its processing by temporarily deactivating the kernel [KRNL].

Figure 13:
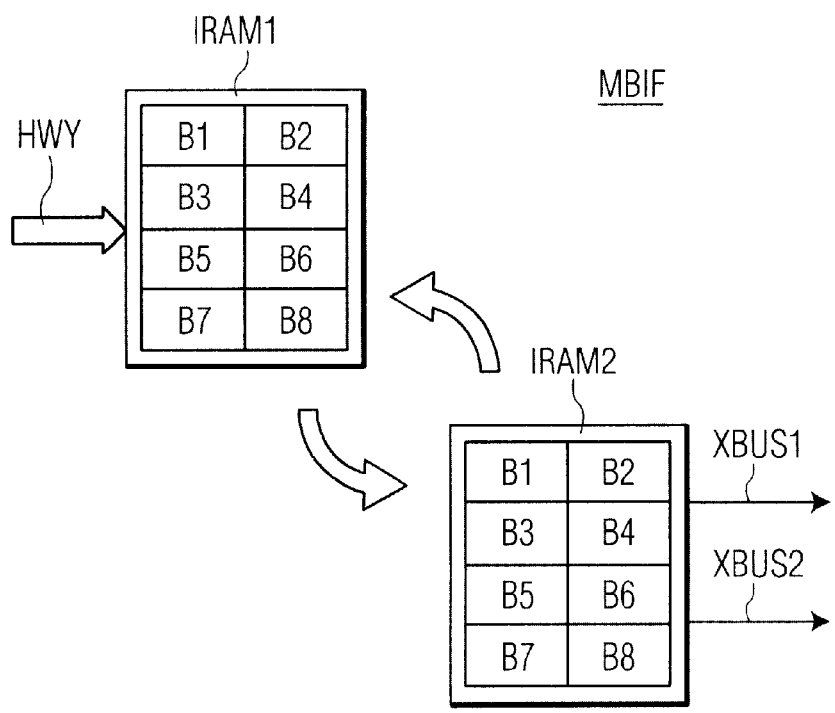
FIG. 13 is a block diagram illustrating a main-bus interface of the video-processing arrangement.

The kernel [KRNL] comprises the following features that prevent the video-processing arrangement illustrated in FIG. 3 from being too much ahead, as it were, with respect to the video-output stream [VIDOUT]. Each cycle of 4 processing steps, the kernel [KRNL] causes the control processor [CPU] shown in FIG. 9 to read a register in the streaming-out circuit [SO] that indicates the position of the current pixel that will be outputted. This register thus indicates whether the processing in the video-processing arrangement is too much ahead, as it were, with respect to the video-output stream [VIDOUT] or not. If the video-processing arrangement is too much ahead, the kernel [KRNL] is de-activated for a certain period of time FIG. 13 illustrates the main-bus interface [MBIF] of the video-processing arrangement shown in FIG. 3. It comprises two buffer memories: a first and second buffer memory [IRAM1, IRAM2] each having a size of 2 Kbytes. Each buffer memory [IRAM] is divided into 8 blocks: a first to eight block [B1, . . . B8] each having a size of 256 bytes.

The main-bus interface [MBIF] basically operates as follows. The buffer memories [IRAM] are alternately coupled to the main bus [HWY] and to the internal busses [XBUS] each cycle of 4 processing steps. That is, the first buffer memory [IRAM1] will be coupled to the main bus [HWY] during a period of 4 consecutive processing steps whereas the second buffer memory [IRAM2] is coupled to the internal busses [XBUS]. This situation is illustrated in FIG. 13. The inverse will apply for the subsequent period of 4 processing steps: the second buffer memory [IRAM2] will be coupled to the main bus [HWY] whereas the first buffer memory [IRAM1] will be coupled to the internal busses [XBUS]. The buffer memory [IRAM1/IRAM2] which, for a given period of 4 consecutive processing steps, is coupled to the main bus [HWY] serves to receive data from the external main memory. Meanwhile, the other buffer memory

[IRAM2/IRAM1], which is coupled to the internal busses [XBUS], serves to transfer data that has been received from the main memory to the first or second filter block or the output block. Thus, with each cycle of 4 consecutive processing steps the buffer memories [IRAM] change roles.

A transfer of data from the main memory to the first or second filter block or the output block takes 3 cycles of 4 consecutive processing steps. In the first cycle, the controller requests the main-bus interface [MBIF] to fetch the data from the main memory. In the second cycle, the data is transferred from the main memory to the buffer memory [IRAM1/IRAM2] that is coupled to the main bus [HWY]. In the third cycle, the same buffer memory [IRAM1/IRAM2] is coupled to the internal busses [XBUS] and the data is transferred from the buffer memory [IRAM1/IRAM2] to the first or second filter block or the output block. It is noted that there is a correspondence with the data-fetch file. The first, second and third cycle described hereinbefore correspond to the initial data-fetch register [HPF0], the intermediate data-fetch register [HFP1] and the final data-fetch register [HFP2], respectively, which registers are illustrated in FIG. 11.

The main-bus interface [MBIF] stores data in the following manner. A buffer memory [IRAM] corresponds to a cycle of 4 consecutive processing steps. The main-bus interface [MBIF] stores in the first and second block [B1, B2] the data that will be transferred from the buffer memory [IRAM] to the first or second filter block or the output block in the first processing step of this cycle. More specifically, it stores the data that will be transferred via the first internal bus [XBUS1] in the first block [B1] and the data that will be transferred via the second internal bus [XBUS2] in the second block [B2]. The data that will be transferred via the first and second internal bus [XBUS1, XBUS2] in the second processing step of the cycle concerned are stored in the third and fourth block [B3, B4], respectively, and so on.

In summary, the first and second block [B1, B2], the third and fourth block [B3, B4], the fifth and sixth block [B5, B6], and the seventh and eight block [B7, B8] correspond to a first, second, third and fourth processing step, respectively, in a cycle of 4 processing steps. The blocks that have an odd number contain data that will be transferred via the first internal bus [XBUS1]. The blocks that have an even number contain data that will be transferred via the second internal bus [XBUS2]. Consequently, each cell of the scheduler [SCHED] illustrated in FIG. 10 is associated with a specific block [B] in a buffer memory [IRAM]. Since a cell of the scheduler [SCHED] defines a particular block of data that needs to be manipulated by the video-processing circuit, it is predefined where this block of data will be stored in the main-bus interface [MBIF].

The scheduler [SCHED] shown in FIG. 9 can be written into the control memory [CMEM] of the controller [MCP] in the following manner. The scheduler [SCHED] illustrated in FIG. 10 may comprise one or more cells that define a task for updating the scheduler [SCHED]. It has already been mentioned that the task number 4 illustrated in FIG. 10 may concern new data for the scheduler [SCHED]. Task number 4 will cause the video-processing arrangement to read from the main memory a block of data that defines a new part of the scheduler [SCHED] and to transfer this block of data from the main memory to the control memory [CMEM].

The main memory may contain the scheduler in a compressed form. In principle, any data compression technique can be used to compress the data that is contained in the scheduler. For example, the portion of the scheduler [SCHED] illustrated in FIG. 10 comprises a series of subsequent cells that contains task number 1. Consequently, the scheduler [SCHED] can be compressed by indicating the series of cells that contain task number 1 instead of defining task number 1 for each cell separately. The control processor [CPU] shown in FIG. 9 can be programmed to decompress a block of data that defines a new portion of the scheduler in a compressed form. Thus, task number 4 illustrated in FIG. 16 may not only cause a block of data that defines a new portion of the scheduler to be read from the main memory. It may also cause the block of data to be decompressed and subsequently added to the scheduler.

The video-processing arrangement illustrated in FIG. 3 can be physically implemented and, subsequently, made operational in the following manner. In a first step, the video-processing arrangement is manufactured, for example, in the form of an integrated circuit containing the various blocks shown in FIG. 3.

In a second step, various control-software items are loaded into the control memory [CMEM], which is shown in FIG. 9. The kernel [KRNL] and the subroutines [SR] are examples of such control-software items. A further control-software item may be, for example, an initialization program that causes a first portion of a scheduler [SCHED] to be loaded into the control memory [CMEM]. The initialization program may further create the outlines of the data-fetch file [DFF] and the task-continuation file [TCF], for example, by defining suitable memory ranges for these items. The control-software items, which are loaded into the control memory [CMEM], may be contained on a data carrier such as, for example, a disk or a non-volatile memory. The control-software items may be retrieved from such a data carrier via a communication network such as, for example, the Internet.

In a third step, one or more schedulers [SCHED] are loaded into a memory that is coupled to the video-processing arrangement illustrated in FIG. 3 via the main bus [HWY]. A scheduler [SCHED] is a set of-program-software items. The control-software items, which have been loaded into the control memory [CMEM], enable the controller [MCP] to execute the program-software items contained in the scheduler [SCHED]. The controller [MCP] will read the scheduler [SCHED] and execute the program items contained therein. A program-software item, when executed, causes the video-processing arrangement to fetch and process a certain block of data. Consequently, the video-processing arrangement will successively process blocks of data. These blocks of data may be contained in the same memory as the scheduler [SCHED] or in separate memory. The scheduler [SCHED], which is loaded into the memory that is coupled to the main bus [HWY], may be contained on a data carrier such as, for example, a disk or a non-volatile memory. The scheduler [SCHED] may be retrieved from such a data carrier via a communication network such as, for example, the Internet.

The video-processing arrangement illustrated in FIG. 3 and further described with reference to FIG. 4 to FIG. 13 is an example of an implementation of the basic features illustrated in FIG. 1. The elementary circuits such as the processing circuits [PRC] and the memory circuits [MEM] illustrated in FIG. 1 take the form of the various circuits that are comprised in the filter blocks [XPB] and the output block [XPC] illustrated in FIG. 4 and FIG. 5, respectively. The task initialization data [TID] illustrated in FIG. 1 takes the form of the data contained in the scheduler [SCHED] illustrated in FIG. 10. In response to the data contained in the scheduler [SCHED], the controller [MCP] illustrated in FIG. 9 applies control data to various processing and memory circuits contained in the filter blocks [XPB] and the output block [XPC]. This causes the video-processing arrangement to process a block of data as, for example, illustrated in FIG. 6.

The drawings and their description hereinbefore illustrate rather than limit the invention. It will be evident that there are numerous alternatives, which fall within the scope of the appended claims. In this respect, the following closing remarks are made.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

What is claimed is:

1. A data-processing arrangement comprising:

a plurality of elementary circuits including processing circuits (PRC) and memory circuits (MEM), a controller (MCP) that is programmed to successively apply, in response to a task-initialization data (TID), control data to different subsets of elementary circuits so as to cause the data-processing arrangement to process a block of data (DB) in accordance with a certain data-processing chain (DPC) whereby each subset of elementary circuits implements a different element (E) of the data-processing chain (DPC);

wherein the controller (MCP) comprises a control processor (CPU) and a control memory (CMEM), the control memory (CMEM) comprising:

a collection of subroutines (SR), each subroutine corresponding to an element (E) of a data-processing chain (DPC) and causing the control processor (CPU) to apply control data (CD) to a subset of elementary circuits (PRC/MEM) which, in response, will carry out the element (E) of the data-processing chain (DPC) concerned, each subroutine (SR) that relates to an element (E) of the data-processing chain (DPC) which is succeeded by another element (E) further causing the control processor (CPU) to write a pointer (P) in a task-continuation file (TCF), the pointer (P) indicating the subroutine (SR) that relates to the subsequent element (E) of the data-processing chain (DPC) concerned; and a basic control program (KRNL) that repetitively causes the control processor (CPU) to read a new task-initialization data (RD(TID), which indicates a subroutine (SR) that relates to a first element of a data-processing chain (DPC), to read the pointers that are contained in the task-continuation file (RD (PETCF) and to execute the subroutines indicated by said new task-initialization data and said pointers (EXEC (SR)).

2. A method of configuring a data-processing arrangement comprising a controller (MCP) and a plurality of elementary circuits including processing circuits (PRC) and memory circuits (MEM), the method comprising the steps of:

(a) programming the controller (MCP) so that the controller successively applies, in response to a task-initialization data (TID), control data (CD) to different subsets of elementary circuits which causes the data-processing arrangement to process a block of data (DB) in accordance with a certain data-processing chain (DPC) whereby each subset of elementary circuits implements a different element (E) of the data-processing chain (DPC);

wherein the controller (MCP) comprises a control processor (CPU) and a control memory (CMEM), and (b) the control memory (CMEM) performs a collection of subroutines (SR), each subroutine corresponding to an element (E) of a data-processing chain (DPC) and causing the control processor (CPU) to apply control data (CD) to a subset of elementary circuits (PRC/MEM) which, in response, will carry out the element (E) of the data-processing chain (DPC) concerned, each subroutine (SR) that relates to an element (E) of the data-processing chain (DPC), and succeeding by another element (E) to causing the control processor (CPU) to write a pointer (P) in a task-continuation file (TCF), the pointer (P) indicating the subroutine (SR) that relates to the subsequent element (E) of the data-processing chain (DPC) concerned; and (c) operating a basic control program (KRNL) that repetitively causes the control processor (CPU) to read a new task-initialization data (RD(TID), which indicates a subroutine (SR) that relates to a first element of a data-processing chain (DPC), to read the pointers that are contained in the task-continuation file (RD(PETCF) and to execute the subroutines indicated by said new task-initialization data and said pointers (EXEC (SR)).

3. A computer program product for a data-processing arrangement comprising a controller (MCP) and a plurality of elementary circuits such as processing circuits (PRC) and memory circuits (MEM), the computer program product comprising a set of the instructions which, when loaded into the controller (MCP) of the data-processing arrangement, causes the controller (MCP) to successively apply, in response to task-initialization data (TID), control data to different subsets of elementary circuits so as to cause the data-processing arrangement to process a block of data (DC) in accordance with a certain data-processing chain (PDC) whereby each subset of elementary circuits implements a different element (E) of the data-processing chain (DPC), wherein the controller (MCP) comprises a control processor (CPU) and a control memory (CMEM), the computer program causes the control memory (CMEM) to perform a collection of subroutines (SR), each subroutine corresponding to an element (E) of a data-processing chain (DPC) and causing the control processor (CPU) to apply control data (CD) to a subset of elementary circuits (PRC/MEM) which, in response, will carry out the element (E) of the data-processing chain (DPC) concerned, each subroutine (SR) that relates to an element (E) of the data-processing chain (DPC), and the computer program succeeds by another element (E) to causing the control processor (CPU) to write a pointer (P) in a task-continuation file (TCF), the pointer (P) indicating the subroutine (SR) that relates to the subsequent element (E) of the data-processing chain (DPC) concerned; and operates a basic control program (KRNL) that repetitively causes the control processor (CPU) to read a new task-initialization data (RD(TID), which indicates a subroutine (SR) that relates to a first element of a data-processing chain (DPC), to read the pointers that are contained in the task-continuation file (RD(PETCF) and to execute the subroutines indicated by said new task-initialization data and said pointers (EXEC (SR)).

* * * * *